(12) United States Patent
Chen et al.

(10) Patent No.: US 9,479,303 B2
(45) Date of Patent: Oct. 25, 2016

(54) ENHANCED POSITIONING REFERENCE SIGNAL TRANSMISSION IN WIRELESS COMMUNICATION NETWORK

(71) Applicant: QUALCOMM Incorporated, San Diego, CA (US)

(72) Inventors: Wanshi Chen, San Diego, CA (US); Peter Gaal, San Diego, CA (US); Hao Xu, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 197 days.

(21) Appl. No.: 13/839,227

(22) Filed: Mar. 15, 2013

(65) Prior Publication Data

US 2014/0112261 A1    Apr. 24, 2014

Related U.S. Application Data

(60) Provisional application No. 61/717,535, filed on Oct. 23, 2012.

(51) Int. Cl.
H04L 5/00 (2006.01)
H04B 7/26 (2006.01)
H04L 5/14 (2006.01)

(52) U.S. Cl.
CPC ........... *H04L 5/0048* (2013.01); *H04B 7/2656* (2013.01); *H04L 5/0023* (2013.01); *H04L 5/1469* (2013.01)

(58) Field of Classification Search
CPC . H04L 5/0048; H04L 5/0023; H04L 5/1469; H04B 7/155; H04B 7/2656
USPC ................ 370/329, 330, 328, 336, 281, 436
See application file for complete search history.

(56) References Cited

U.S. PATENT DOCUMENTS

| 8,274,959 | B2 | 9/2012 | Lee et al. | |
|---|---|---|---|---|
| 2009/0129298 | A1* | 5/2009 | Luo | H04W 56/001 370/280 |
| 2010/0273506 | A1* | 10/2010 | Stern-Berkowitz | G01S 5/0009 455/456.1 |
| 2011/0158200 | A1* | 6/2011 | Bachu | H04L 5/0007 370/330 |
| 2012/0027110 | A1* | 2/2012 | Han et al. | 375/260 |
| 2012/0094691 | A1* | 4/2012 | Chen et al. | 455/456.1 |
| 2012/0122472 | A1* | 5/2012 | Krishnamurthy | H04L 5/0053 455/456.1 |
| 2012/0127964 | A1 | 5/2012 | Turtinen et al. | |
| 2012/0264449 | A1 | 10/2012 | Kazmi et al. | |
| 2012/0270572 | A1 | 10/2012 | Siomina et al. | |

(Continued)

OTHER PUBLICATIONS

International Search Report and Written Opinion—PCT/US2013/065964—ISAEPO—Apr. 4, 2014.

(Continued)

*Primary Examiner* — Habte Mered
*Assistant Examiner* — Rownak Islam
(74) *Attorney, Agent, or Firm* — Patterson & Sheridan, LLP

(57) ABSTRACT

Methods and apparatus for determining a PRS configuration in a dynamic TDD configuration adaptation are described. One example method generally includes determining a first PRS configuration for receiving PRS when communicating according to a first subframe configuration that defines one or more uplink subframes and one or more downlink subframes, receiving an indication of a switch from the first subframe configuration to a second subframe configuration, and determining a second PRS configuration for receiving PRS when communicating according to the second subframe configuration.

33 Claims, 6 Drawing Sheets

(56) References Cited

U.S. PATENT DOCUMENTS

| | | | | |
|---|---|---|---|---|
| 2012/0300681 A1* | 11/2012 | Ji | ............................ | H04W 56/00 370/280 |
| 2013/0188510 A1* | 7/2013 | Siomina | ................ | H04W 24/10 370/252 |
| 2014/0122957 A1* | 5/2014 | Charbit | ..................... | H04L 1/08 714/748 |
| 2014/0301336 A1* | 10/2014 | Kim et al. | ..................... | 370/329 |

OTHER PUBLICATIONS

Zte: "Some Considerations on Positioning Function in LTE R9", 3GPP Draft; R1-092176 Some Considerations on Positioning Function in LTE R9, 3rd Generation Partnership Project (3GPP) Mobile Competence Centre; 650, Route Des Lucioles ; F-06921 Sophia-Antipolis Cedex; France, No. San Francisco, USA; 20090428, Apr. 28, 2009 (Apr. 28, 2009), XP050339611, pp. 1-5.

Editor (Ericsson): "Inclusion of Rel-11 features", 3GPP Draft; R1-124010 CR to 36.211 After RAN1#70, 3rd Generation Partnership Project (3GPP), Mobile Competence Centre, 650, Route Des Lucioles, F-06921 Sophia-Antipolis Cedex; France, vol. RAN WG1, No. Qingdao, China; 20120813-20120817 Sep. 19, 2012 (Sep. 19, 2012), pp. 1-42, XP050661889, Retrieved from the Internet: URL: http://www.3gpp.org/ftp/tsg_ran/WG1_RL1/TSGR1_70/Docs/ [retrieved on Sep. 19, 2012] p. 6-p. 7 p. 85-p. 87.
LG Electronics: "TDD DL:-UL Reconfiguration Methods for eiMTA", 3GPP Draft; R1-122318 TDD DL-UL Reconfiguration Methods for EIMTA_LG, 3rd Generation Partnership Project (3GPP), Mobile Competence Centre; 650, Route Des Lucioles; F-06921 Sophia-Antipolis Cedex; France, vol. RAN WG1, No. Prague, Czech Republic; 20120521-20120525, May 12, 2012 (May 12, 2012), XP050600581, [retrieved on May 12, 2012].
Partial International Search Report—PCT/US2013/065964—ISA/EPO—Feb. 14, 2014.

\* cited by examiner

ENHANCED POSITIONING REFERENCE SIGNAL TRANSMISSION IN WIRELESS COMMUNICATION NETWORK

CROSS-REFERENCE TO RELATED APPLICATIONS

This application claims benefit of U.S. Provisional Patent Application Ser. No. 61/717,535, filed Oct. 23, 2012, which is incorporated by reference herein in its entirety.

BACKGROUND

I. Field

The present disclosure relates generally to wireless communications, and more specifically, to techniques for transmitting positioning reference signals (PRSs) in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A wireless communication network may support operation on multiple component carriers (CCs). A CC may refer to a range of frequencies used for communication and may be associated with certain characteristics. For example, a CC may be associated with system information describing operation on the CC. A CC may also be referred to as a carrier, a frequency channel, a cell, etc. A base station may send data and downlink control information (DCI) on one or more CCs to a UE. The UE may send data and uplink control information (UCI) on one or more CCs to the base station.

SUMMARY

In an aspect of the disclosure, a method for wireless communications by a user equipment (UE) is provided. The method generally includes determining a first positioning reference signal (PRS) configuration for receiving PRS when communicating according to a first subframe configuration that defines one or more uplink subframes and one or more downlink subframes, receiving an indication of a switch from the first subframe configuration to a second subframe configuration, and determining a second PRS configuration for receiving PRS when communicating according to the second subframe configuration.

In an aspect of the disclosure, an apparatus for wireless communications by a UE is provided. The apparatus generally includes means for determining a first positioning reference signal (PRS) configuration for receiving PRS when communicating according to a first subframe configuration that defines one or more uplink subframes and one or more downlink subframes, means for receiving an indication of a switch from the first subframe configuration to a second subframe configuration, and means for determining a second PRS configuration for receiving PRS when communicating according to the second subframe configuration.

In an aspect of the disclosure, an apparatus for wireless communications by a UE is provided. The apparatus generally includes at least one processor and a memory coupled to the at least one processor. The at least one processor is generally configured to determine a first positioning reference signal (PRS) configuration for receiving PRS when communicating according to a first subframe configuration that defines one or more uplink subframes and one or more downlink subframes, receive an indication of a switch from the first subframe configuration to a second subframe configuration, and determine a second PRS configuration for receiving PRS when communicating according to the second subframe configuration.

In an aspect of the disclosure, a computer-program product for wireless communications by a UE is provided. The computer-program product generally includes a computer-readable medium having instructions stored thereon, the instructions being executable by one or more processors and the instructions generally including instructions for determining a first positioning reference signal (PRS) configuration for receiving PRS when communicating according to a first subframe configuration that defines one or more uplink subframes and one or more downlink subframes, instructions for receiving an indication of a switch from the first subframe configuration to a second subframe configuration, and instructions for determining a second PRS configuration for receiving PRS when communicating according to the second subframe configuration.

In an aspect of the disclosure, a method for wireless communications by a user equipment (UE) is provided. The method generally includes determining a first positioning reference signal (PRS) configuration for a first cell, wherein the first PRS configuration is for receiving PRS from the first cell when communicating according to a first subframe configuration, the first subframe configuration indicating one or more uplink subframes and one or more downlink subframes, determining a second PRS configuration for a second cell, wherein the second PRS configuration is for receiving PRS from the second cell when communicating according to a second subframe configuration, and defining the first PRS configuration and the second PRS configuration based on one or more common downlink subframes between the first subframe configuration and the second subframe configuration.

In an aspect of the disclosure, an apparatus for wireless communications by a UE is provided. The apparatus generally includes means for determining a first positioning reference signal (PRS) configuration for a first cell, wherein the first PRS configuration is for receiving PRS from the first cell when communicating according to a first subframe configuration, the first subframe configuration indicating one or more uplink subframes and one or more downlink subframes, means for determining a second PRS configuration for a second cell, wherein the second PRS configuration is for receiving PRS from the second cell when communicating according to a second subframe configuration, and means for defining the first PRS configuration and the second PRS configuration based on one or more common downlink subframes between the first subframe configuration and the second subframe configuration.

In an aspect of the disclosure, an apparatus for wireless communications by a UE is provided. The apparatus generally includes at least one processor and a memory coupled to the at least one processor. The at least one processor is generally configured to determine a first positioning reference signal (PRS) configuration for a first cell, wherein the first PRS configuration is for receiving PRS from the first cell when communicating according to a first subframe configuration, the first subframe configuration indicating one or more uplink subframes and one or more downlink subframes, determine a second PRS configuration for a second cell, wherein the second PRS configuration is for receiving PRS from the second cell when communicating according to a second subframe configuration, and define the first PRS configuration and the second PRS configuration based on one or more common downlink subframes between the first subframe configuration and the second subframe configuration.

In an aspect of the disclosure, a computer-program product for wireless communications by a UE is provided. The computer-program product generally includes a computer-readable medium having instructions stored thereon, the instructions being executable by one or more processors and the instructions generally including instructions for determining a first positioning reference signal (PRS) configuration for a first cell, wherein the first PRS configuration is for receiving PRS from the first cell when communicating according to a first subframe configuration, the first subframe configuration indicating one or more uplink subframes and one or more downlink subframes, instructions for determining a second PRS configuration for a second cell, wherein the second PRS configuration is for receiving PRS from the second cell when communicating according to a second subframe configuration, and instructions for defining the first PRS configuration and the second PRS configuration based on one or more common downlink subframes between the first subframe configuration and the second subframe configuration.

Various aspects and features of the disclosure are described in further detail below.

DETAILED DESCRIPTION

Figure 1:
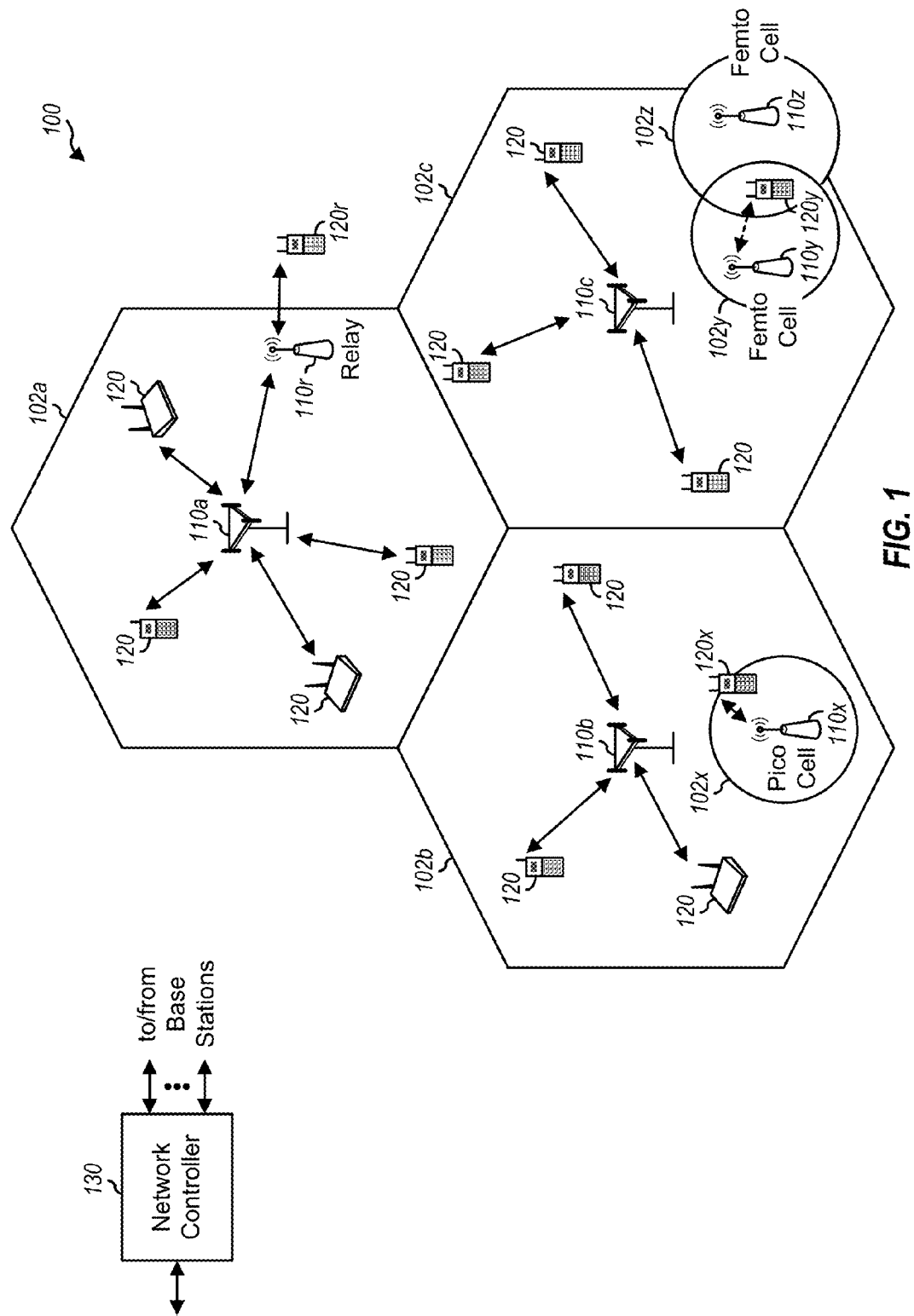
FIG. 1 is a block diagram conceptually illustrating an example of a wireless communication network, in accordance with certain aspects of the present disclosure.

Techniques and apparatus are provided herein for transmitting positioning reference signals (PRSs) in a wireless communication network. According to aspects a user equipment (UE) determines PRS configuration according to a subframe configuration that defines uplink and downlink subframes. If the subframe configuration changes, the UE determines a new PRS configuration according to the new changed subframe configuration The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication networks such as CDMA, TDMA, FDMA, OFDMA, SC-FDMA and other wireless networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi and Wi-Fi Direct), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplex (FDD) and time division duplex (TDD), are recent releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below. In the description herein, the term "LTE" generically refers to all releases of LTE unless noted otherwise.

FIG. 1 is a block diagram conceptually illustrating an example of a wireless communication network, which may be an LTE network or some other wireless network, in accordance with certain aspects of the present disclosure. Wireless network 100 may include a number of evolved Node Bs (eNBs) 110 and other network entities. An eNB may be an entity that communicates with the UEs and may also be referred to as a base station, a Node B, an access point, etc. Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). In the example shown in FIG. 1, eNBs 110a, 110b and 110c may be macro eNBs for macro cells 102a, 102b and 102c, respectively. An eNB 110x may be a pico eNB for a pico cell 102x. eNBs 110y and 110z may be home eNBs for femto cells 102y and 102z, respectively. An eNB may support one or multiple (e.g., three) cells.

Wireless network 100 may also include relays. A relay may be an entity that receives a transmission of data from an upstream station (e.g., an eNB or a UE) and sends a transmission of the data to a downstream station (e.g., a UE or an eNB). A relay may also be a UE that relays transmissions for other UEs. In the example shown in FIG. 1, a relay 110r may communicate with eNB 110a and a UE 120r in order to facilitate communication between eNB 110a and UE 120r.

A network controller 130 may couple to a set of eNBs and provide coordination and control for these eNBs. Network controller 130 may communicate with the eNBs via a backhaul. The eNBs may also communicate with one another, e.g., directly or indirectly via wireless or wireline backhaul.

UEs 120 (e.g., 120x, 120y, etc.) may be dispersed throughout wireless network 100, and each UE may be stationary or mobile. A UE may also be referred to as a terminal, a mobile station, a subscriber unit, a station, etc. A UE may be a cellular phone, a smartphone, a tablet, a netbook, a smart book, an ultrabook, a personal digital assistant (PDA), a wireless modem, a wireless communication device, a handheld device, a laptop computer, a cordless phone, a wireless local loop (WLL) station, etc. A UE may be able to communicate with macro eNBs, pico eNBs, femto eNBs, relays, other UEs, etc.

Wireless network 100 may support hybrid automatic retransmission (HARQ) in order to improve reliability of data transmission. For HARQ, a transmitter (e.g., an eNB) may send a transmission of a transport block and may send one or more additional transmissions, if needed, until the transport block is decoded correctly by a receiver (e.g., a UE), or the maximum number of transmissions has been sent, or some other termination condition is encountered. A transport block may also be referred to as a packet, a codeword, etc. For synchronous HARQ, all transmissions of the transport block may be sent in subframes of a single HARQ interlace, which may include evenly spaced subframes. For asynchronous HARQ, each transmission of the transport block may be sent in any subframe.

Wireless network 100 may utilize frequency-division duplex (FDD) and/or time-division duplex (TDD). For FDD, the downlink and uplink may be allocated separate frequency channels, and downlink transmissions and uplink transmissions may be sent concurrently on the separate frequency channels. For TDD, the downlink and uplink may share the same frequency channel, and downlink and uplink transmissions may be sent on the same frequency channel in different time periods. In the description herein, an FDD CC is a CC utilizing FDD, and a TDD CC is a CC utilizing TDD.

Figure 2:
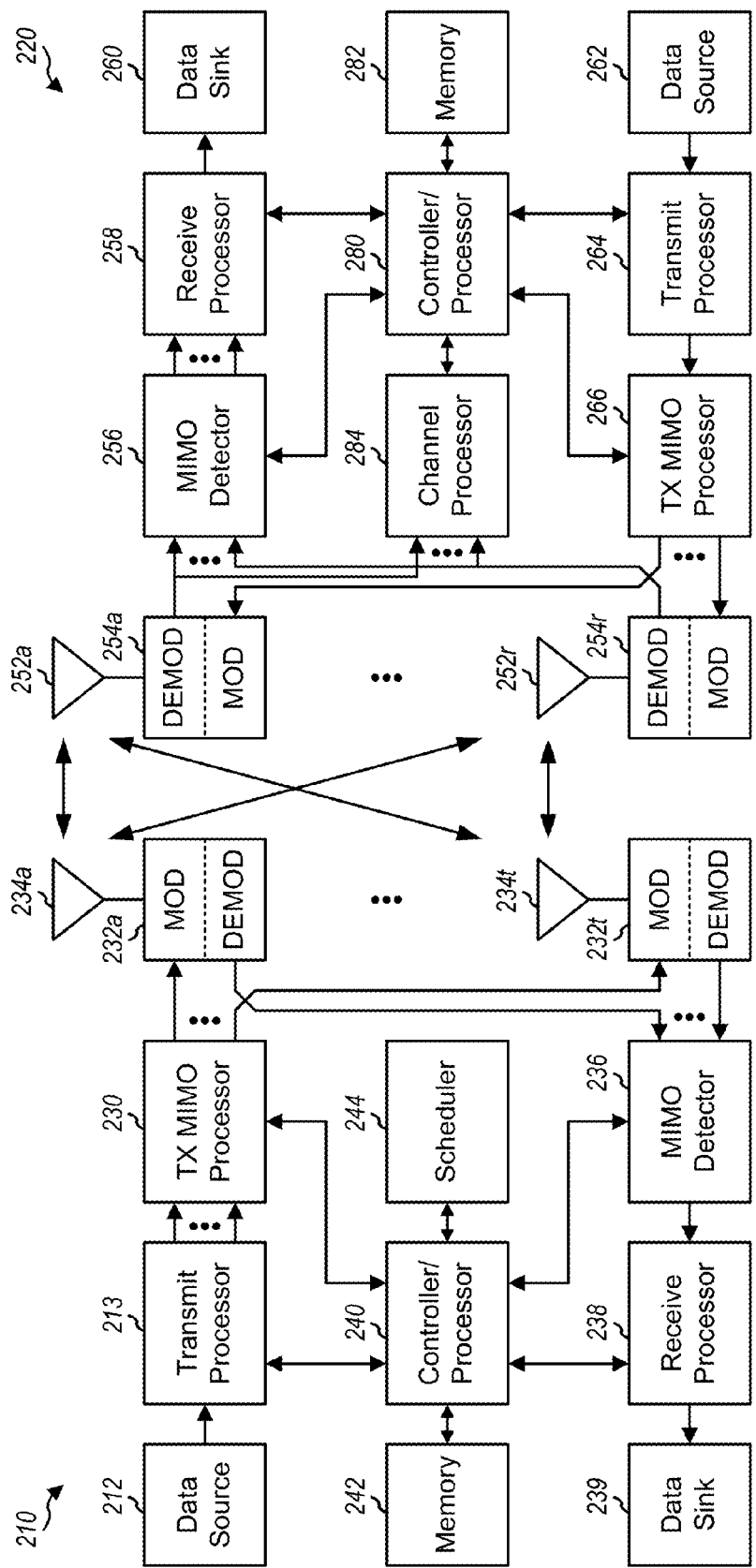
FIG. 2 shows a block diagram conceptually illustrating an example of a base station in communication with a user equipment (UE) in a wireless communications network, in accordance with certain aspects of the present disclosure.

FIG. 2 shows a block diagram conceptually illustrating an example of a base station/eNB 210 in communication with a UE 220, which may be one of the base stations/eNBs and one of the UEs in FIG. 1, in a wireless communications network, in accordance with certain aspects of the present disclosure. Base station 210 may be equipped with T antennas 234a through 234t, and UE 220 may be equipped with R antennas 252a through 252r, where in general $T \geq 1$ and $R \geq 1$.

At base station 210, a transmit processor 213 may receive data from a data source 212 for transmission to one or more UEs on one or more CCs, process (e.g., encode and modulate) the data for each UE based on one or more modulation and coding schemes selected for that UE, and provide data symbols for all UEs. Transmit processor 213 may also process DCI (e.g., downlink grants, uplink grants, ACK/NACK, configuration messages, etc.) and provide control symbols. Processor 213 may also generate reference symbols for reference signals. A transmit (TX) multiple-input multiple-output (MIMO) processor 230 may precode the data symbols, the control symbols, and/or the reference symbols (if applicable) and may provide T output symbol streams to T modulators (MOD) 232a through 232t. Each modulator 232 may process its output symbol stream (e.g., for OFDM, etc.) to obtain an output sample stream. Each modulator 232 may further condition (e.g., convert to analog, amplify, filter, and upconvert) its output sample stream to obtain a downlink signal. T downlink signals from modulators 232a through 232t may be transmitted via T antennas 234a through 234t, respectively.

At UE 220, antennas 252a through 252r may receive the downlink signals from base station 210 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 220 to a data sink 260, and provide decoded DCI to a controller/processor 280. UE 220 may also include channel processor 284.

On the uplink, at UE 220, a transmit processor 264 may receive and process data from a data source 262 and UCI (e.g., ACK/NACK, CSI, etc.) from controller/processor 260. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 210. At base station 210, the uplink signals from UE 220 and other UEs may be received by antennas 234, processed by demodulators 232, detected by a MIMO detector 236 if applicable, and further processed by a receive processor 238 to obtain decoded data and control information sent by UE 220 and other UEs. Processor 238 may provide the decoded data to a data sink 239 and the decoded UCI to controller/processor 240.

Controllers/processors 240 and 280 may direct the operation at base station 210 and UE 220, respectively. Processor 280 and/or other processors and modules at UE 220 may perform or direct process 500 in FIG. 5, process 600 in FIG. 6, and/or other processes for the techniques described herein. Memories 242 and 282 may store data and program codes for base station 210 and UE 220, respectively. A scheduler 244 may schedule UEs for data transmissions on the downlink and/or uplink.

Figure 3:
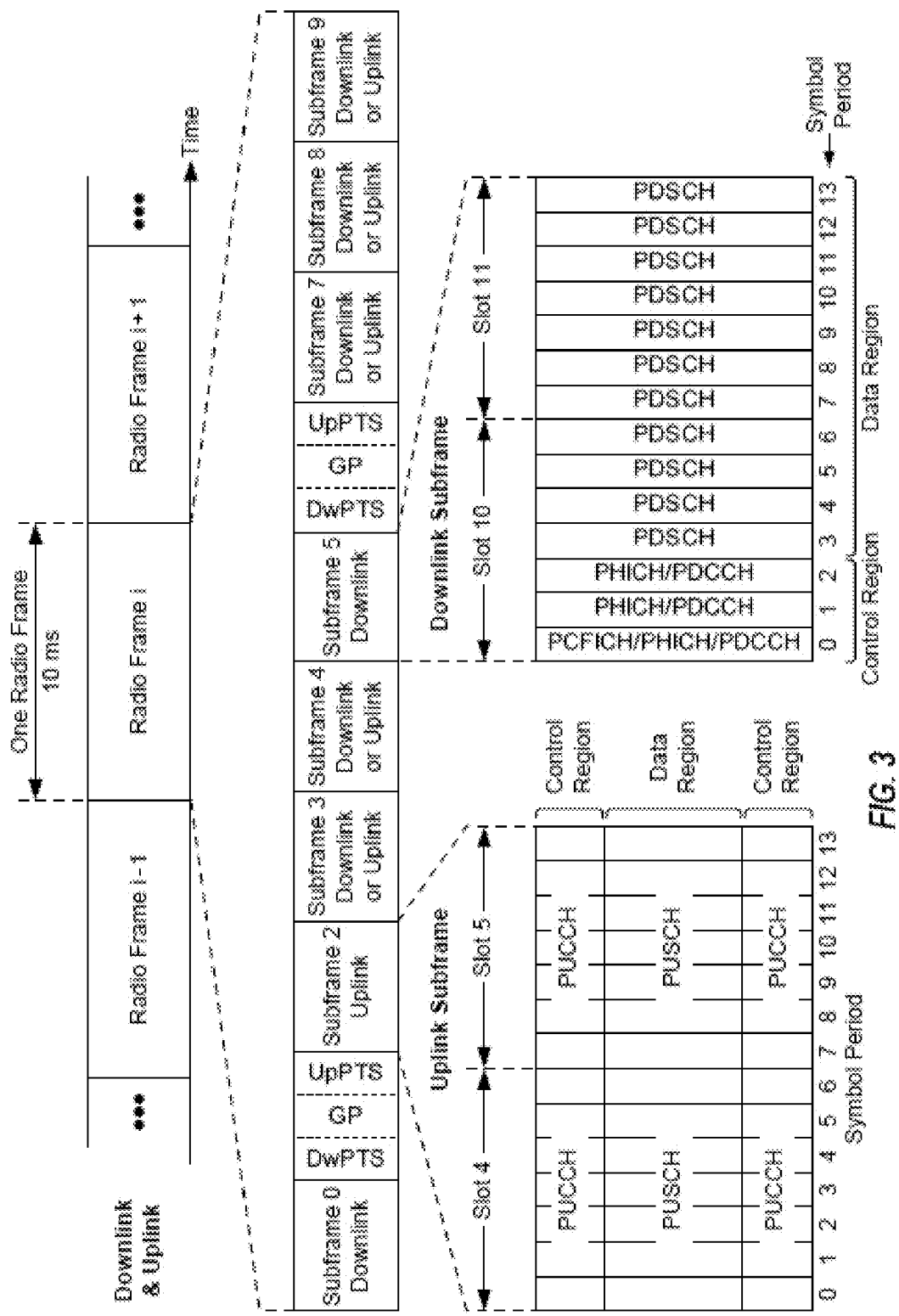
FIG. 3 is a block diagram conceptually illustrating an example of a frame structure in a wireless communications network, in accordance with certain aspects of the present disclosure.

FIG. 3 is a block diagram conceptually illustrating an example of a frame structure in a wireless communications network, in accordance with certain aspects of the present disclosure. The transmission timeline for the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1. The available time frequency resources may be partitioned into resource blocks. Each resource block may cover 12 subcarriers in one slot.

LTE supports a number of uplink-downlink configurations for TDD. Subframes 0 and 5 are used for the downlink and subframe 2 is used for the uplink for all uplink-downlink configurations. Subframes 3, 4, 7, 8 and 9 may each be used for the downlink or uplink depending on the uplink-downlink configuration. Subframe 1 includes three special fields composed of (i) a Downlink Pilot Time Slot (DwPTS) used for downlink control channels as well as data transmissions, (ii) a Guard Period (GP) of no transmission, and (iii) an Uplink Pilot Time Slot (UpPTS) used for either a Random Access Channel (RACH) or sounding reference signals (SRS). Subframe 6 may include only the DwPTS, or all three special fields, or a downlink subframe depending on the uplink-downlink configuration. The DwPTS, GP and UpPTS may have different durations for different subframe configurations. A subframe used for the downlink may be referred to as a downlink subframe, and a subframe used for the uplink may be referred to as an uplink subframe.

Table 1 lists seven uplink-downlink configurations supported by LTE for TDD. Each uplink-downlink configuration indicates whether each subframe is a downlink subframe (denoted as "D" in Table 1), or an uplink subframe (denoted as "U" in Table 1), or a special subframe (denoted as "S" in Table 1). As shown in Table 1, for example, uplink-downlink configurations 2 through 5 are downlink heavy, which means that there are more downlink subframes than uplink subframes in each radio frame. For example, uplink-downlink configuration 6 is uplink heavy, which means that there is more uplink subframes than downlink subframes in each radio frame.

TABLE 1

Uplink-Downlink Configurations for TDD

| Uplink-Downlink Configuration | Subframe Number n | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

As shown in FIG. 3, a downlink subframe may include a control region time division multiplexed (TDM) with a data region. The control region may occupy the first M symbol periods of a subframe, where M may be 1, 2, 3 or 4 and may change from subframe to subframe. The data region may occupy the remaining symbol periods of a subframe.

An uplink subframe may include a control region frequency division multiplexed (FDM) with a data region. The control region may occupy resource blocks near the two edges of the system bandwidth. The data region may occupy the remaining resource blocks in the middle of the system bandwidth.

As shown in FIG. 3, on the downlink in LTE, an eNB may transmit a Physical Control Format Indicator Channel (PCFICH), a Physical HARQ Indicator Channel (PHICH), a Physical Downlink Control Channel (PDCCH), and/or other physical channels in the control region of a subframe. The PCFICH may convey the size of the control region. The PHICH may carry ACK/NACK for data transmission sent on the uplink with HARQ. The PDCCH may carry downlink control information (DCI) such as downlink grants, uplink grants, etc. The eNB may transmit a Physical Downlink Shared Channel (PDSCH) and/or other physical channels in the data region of a subframe. The PDSCH may carry data for UEs scheduled for data transmission on the downlink.

As also shown in FIG. 3, on the uplink in LTE, a UE may transmit a Physical Uplink Control Channel (PUCCH) in the control region of a subframe or a Physical Uplink Shared Channel (PUSCH) in the data region of the subframe. The PUCCH may carry uplink control information (UCI) such as ACK/NACK for data transmission sent on the downlink with HARQ, channel state information (CSI) to support data transmission on the downlink, etc. The PUSCH may carry only data or both data and UCI.

The various signals and channels in LTE are described in 3GPP TS 36.211, entitled "Evolved Universal Terrestrial Radio Access (E-UTRA); Physical Channels and Modulation," which is publicly available.

In LTE Release 9 and later, positioning reference signals (PRS) are supported. PRS may be used for estimating the position of a UE (e.g., as a distance from a transmitting base station). The estimated position may be used for various purposes, for example, location services usage. PRS, along with other reference signals, such as cell-specific reference signals (CRS), may be used for various purposes such as channel estimation, channel measurement, channel feedback reporting, etc. Referring back to FIG. 3, a cell may transmit PRS and/or CRS in certain symbol periods of each subframe (not illustrated). The CRS and PRS may be specific for the cell and may be generated based on a cell identity (ID) of the cell.

Figure 4B:
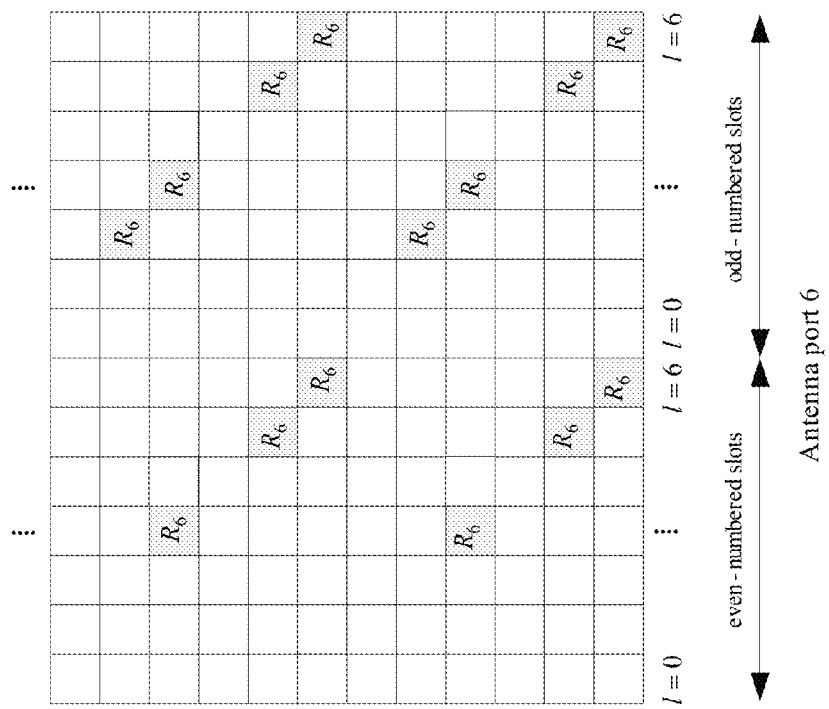
FIG. 4B illustrates legacy PRS pattern for four CRS ports, in accordance with certain aspects of the present disclosure.
Figure 4A:
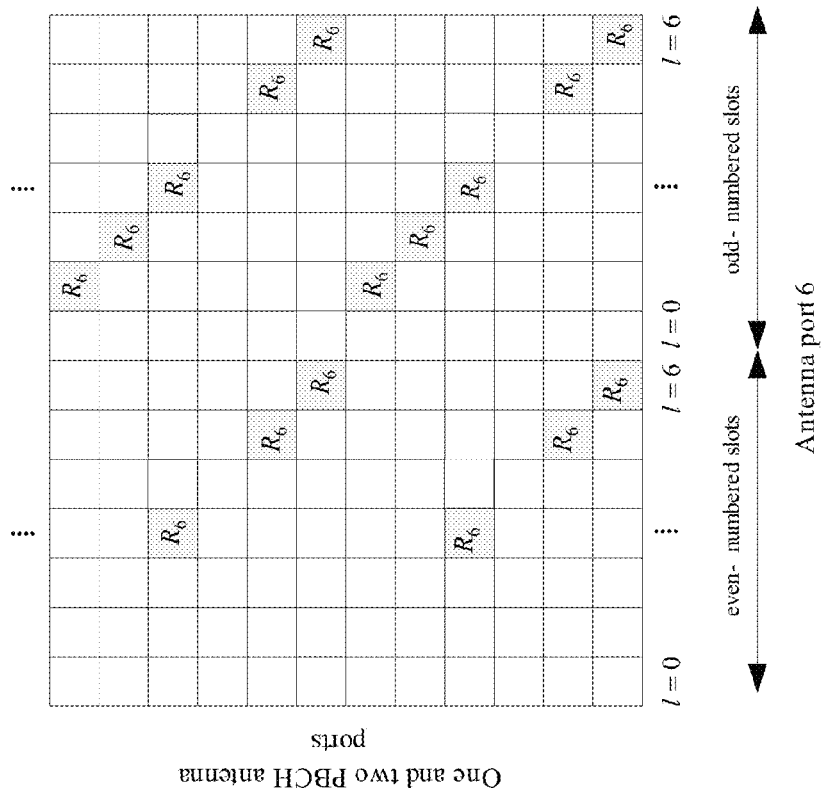
FIG. 4A illustrates legacy positioning reference signal (PRS) pattern for one and two cell-specific reference signal (CRS) ports, in accordance with certain aspects of the present disclosure.

FIGS. 4A-4B illustrate a legacy PRS pattern for one and two CRS ports and four CRS ports, in accordance with certain aspects of the present disclosure. In certain aspects, for both normal cyclic prefix (CP) and extended CP types, PRS is present in all symbols except those for legacy control and common reference signal (CRS). The pattern of PRS generally exhibits a "diagonal" property, but omits the symbols containing CRS. For example, as shown in FIG. 4A, for the one and two CRS ports case, PRS is not present in symbol 4 of the first slot and symbols 0 and 4 in the second slot. As another example, as shown in FIG. 4B, for the four CRS ports case, PRS is not present in symbol 1 of the second slot.

PRS is transmitted only in resource blocks (RB) of downlink subframes configured for PRS transmission. Generally, the periodicity (e.g., 160, 320, 640, or 1280 ms) $T_{PRS}$ and subframe offset $\Delta_{PRS}$ for PRS subframes are configurable on a per cell basis. Further, positioning reference signals are transmitted in $N_{PRS}$ consecutive downlink subframes, where $N_{PRS}$ is configured by higher layers (e.g., 1, 2, 4 or 6 subframes). In certain aspects, the first subframe of the $N_{PRS}$ downlink subframes for PRS transmission instances satisfies the following equation:

$$(10 \times n_f + \lfloor n_s/2 \rfloor - \Delta_{PRS}) \bmod T_{PRS} = 0,$$

where $n_f$ is the frame index and $n_s$ is the slot index.

In certain aspects, PRS may be in both Multimedia Broadcast Single Frequency Network (MBSFN) and/or non-MBSFN (normal) subframes. PRS may not be transmitted in special subframes in TDD. Further, PRS may not be mapped to resource elements allocated to PBCH, PSS or SSS.

Bandwidth for PRS is configurable, and may be the same or less than downlink system bandwidth. If both normal and MBSFN subframes are configured as positioning subframes within a cell, the OFDM symbols in a MBSFN subframe configured for positioning reference signal transmission may use the same cyclic prefix as used for subframe 0. If only MBSFN subframes are configured as positioning subframes within a cell, the OFDM symbols configured for positioning reference signals in the MBSFN region of these subframes may use extended cyclic prefix length.

For certain aspects, the TDD DL (downlink)/UL (uplink) subframe configuration may be dynamically adapted, based on the actual traffic needs. For example, if during a short duration a large data burst on downlink is needed, the configuration may be changed from configuration #1 to configuration #5. The adaptation of TDD configuration is expected to be no slower than 640 ms. However, the adaptation of TDD configuration may be as fast as 10 ms, although not desirable.

A PRS configured in a cell for a first TDD downlink/uplink subframe configuration may not be consistent with a second TDD downlink/uplink subframe configuration when dynamic TDD downlink/uplink subframe configuration is enabled by the cell. For example, an original downlink subframe carrying PRS may now become an uplink subframe after a TDD DL/UL subframe configuration change.

Therefore, certain aspects of the present disclosure provide techniques for determining a PRS configuration in a dynamic TDD configuration adaptation.

Figure 5:
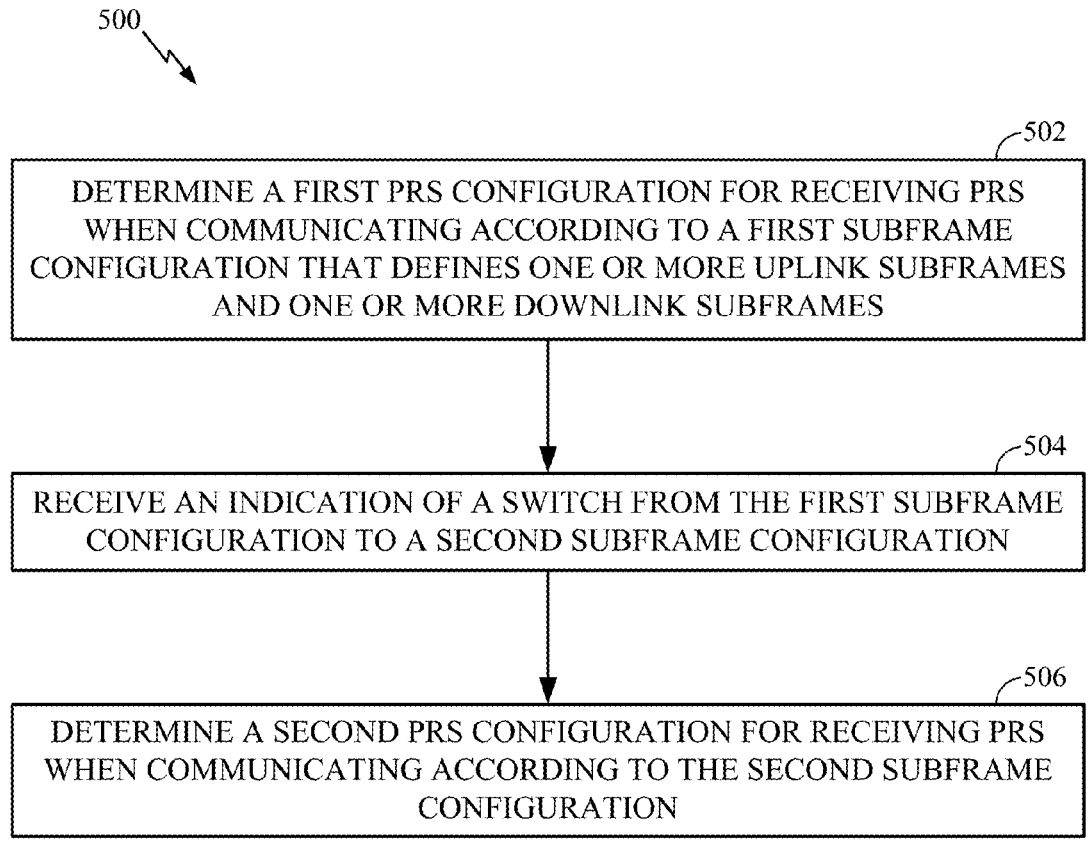
FIG. 5 illustrates example operations for determining a PRS configuration when switching between subframe configurations, in accordance with certain aspects of the present disclosure.

FIG. 5 illustrates example operations 500 for determining a PRS configuration when switching between subframe configurations, in accordance with certain aspects of the present disclosure. The operations 500 may be performed, for example, by a UE. At 502, the UE may determine a first PRS configuration for receiving PRS when communicating according to a first subframe configuration that defines one or more uplink subframes and one or more downlink subframes.

At 504, the UE may receive an indication of a switch from the first subframe configuration to a second subframe configuration. Alternatively, for example, the UE may determine a switch from the first subframe configuration to a second subframe configuration based on a blind detection.

At 506, the UE may determine a second PRS configuration for receiving PRS when communicating according to the second subframe configuration. For certain aspects, the first and second PRS configurations may be defined based on one or more common downlink subframes between the first and second subframe configurations, and the UE may determine the second PRS configuration by receiving signaling indicating the one or more common downlink subframes. For certain aspects, the first PRS configuration may be defined based on downlink subframes associated with the first subframe configuration, and the second PRS configuration may be defined based on downlink subframes associated with the second subframe configuration. The first and second PRS configurations may be different if one or more of the downlink subframes associated with the first subframe configuration that are configured for PRS correspond to uplink subframes associated with the second subframe configuration.

Across different cells, a PRS configured for a first cell of a first TDD downlink/uplink subframe configuration may not be consistent with a second cell of a second TDD downlink/uplink subframe configuration. For example, a downlink subframe in a first cell carrying PRS may be interfered by uplink transmission in an uplink subframe of a second cell.

Figure 6:
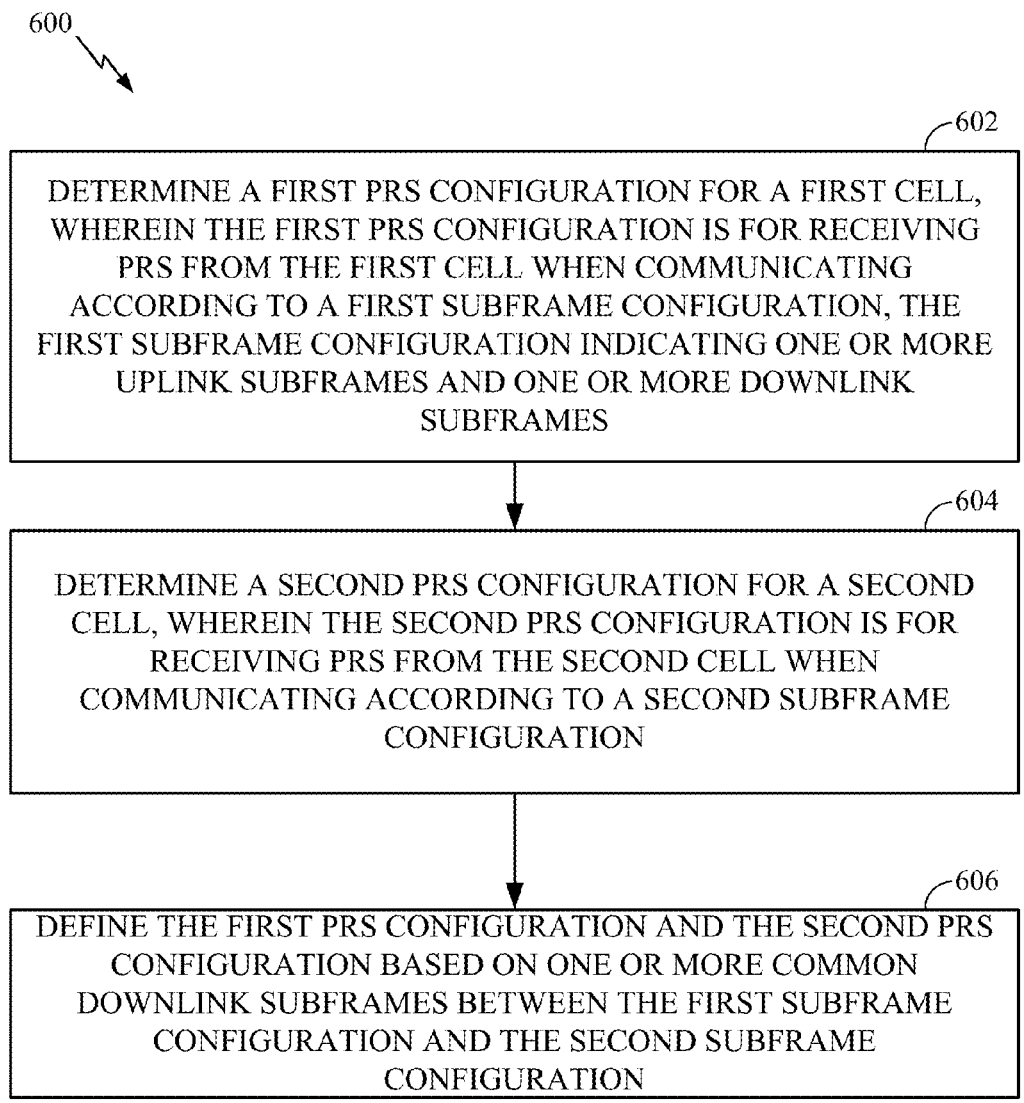
FIG. 6 illustrates example operations for determining a PRS configuration for multiple cells, in accordance with certain aspects of the present disclosure.

FIG. 6 illustrates example operations 600 for determining a PRS configuration for multiple cells, in accordance with certain aspects of the present disclosure. The operations 600 may be performed, for example, by a UE. At 602, the UE may determine a first PRS configuration for a first cell, wherein the first PRS configuration is for receiving PRS from the first cell when communicating according to a first subframe configuration, the first subframe configuration indicating one or more uplink subframes and one or more downlink subframes.

At 604, the UE may determine a second PRS configuration for a second cell, wherein the second PRS configuration is for receiving PRS from the second cell when communicating according to a second subframe configuration.

At 606, the UE may define the first PRS configuration and the second PRS configuration based on one or more common downlink subframes between the first subframe configuration and the second subframe configuration. For certain aspects, the first and second PRS configurations may be the same. For certain aspects, the first PRS configuration may be defined based on downlink subframes associated with the first subframe configuration, and the second PRS configuration may be defined based on downlink subframes associated with the second subframe configuration. The first and second PRS configurations may be different if one or more of the downlink subframes associated with the first subframe configuration that are configured for PRS correspond to uplink subframes associated with the second subframe configuration. For certain aspects, the second PRS configuration may correspond to other downlink subframes associated with the first subframe configuration that are configured for PRS, wherein the other downlink subframes correspond to downlink subframes associated with the second subframe configuration.

In some embodiments, the UE may receive an indication of the frequency locations of PRSs that are transmitted in downlink subframes. For certain aspects, the UE may receive a list of PRS configurations corresponding to different subframe configurations For certain aspects, PRS subframes may be defined based on a set of downlink subframes, independent of the actual TDD DL/UL subframe configuration in a given frame. As an example, since for all TDD DL/UL subframe configurations, subframe #0 and subframe #5 are always downlink subframes, PRS may be defined based on these two subframes, and not based on other downlink subframes that are associated with a given TDD DL/UL subframe configurations. However, if only subframe #0 and subframe #5 are for PRS, CP for PRS may have to be the same as that of subframe #0. Extended CP for PRS may not be supported if subframe #0 is normal CP. In such a case, the PRS configuration may further indicate whether the CP type for PRS is normal CP or extended CP.

As another example, if a cell switches between configuration #1 (e.g., DSUUDDSUUD) and configuration #2 (e.g., DSUDDDSUDD), the PRS subframes may be defined based on the common downlink subframes between the two configurations, (e.g., subframes #0, #4, #5, and #9). More downlink subframes may potentially be used for PRS. As another example, if a first cell uses configuration #1 (e.g., DSUUDDSUUD) and a second cell uses configuration #2 (e.g., DSUDDDSUDD), the PRS subframes may be defined based on the common downlink subframes between the two cells (e.g., subframes #0, #4, #5, and #9). The set of subframes may be signaled to a UE via broadcast or unicast signaling.

For certain aspects, PRS subframes may be defined based on the actual available DL subframes associated with an active TDD DL/UL subframe configuration in a given frame. PRS transmission subframes may be updated if a TDD DL/UL subframe configuration is updated. For example, assuming $N_{PRS}$ is 6, for a cell originally configured according to subframe configuration #1 (e.g., DSUUDDSUUD), PRS may start transmitting from subframe #0 and is transmitted four times (e.g., subframes #0, #4, #5, #9) in the frame. In the next frame, if the cell switches to subframe configuration #2 (e.g., DSUDDDSUDD), PRS may continue transmitting in subframes #0 and subframe #3.

As another example, assuming $N_{PRS}$ is 2, for a cell originally configured according to the second subframe configuration (e.g., DSUDDDSUDD), PRS may be transmitted in subframes #0 and #3 every 160 ms. If the cell later switches to configuration #0 (e.g., DSUUUDSUUU), PRS may be transmitted in subframes #0 and #5 every 160 ms.

For certain aspects, there may be PRS configuration inconsistencies after switching TDD DL/UL subframe configurations in a cell. As an example, a cell starts with configuration #2 (e.g., DSUDDDSUDD), and PRS is transmitted in subframe #3 every 160 ms. If the cell later switches to configuration #0 (e.g., DSUUUDSUUU) subframe #3 is now an uplink subframe, leading to PRS configuration inconsistencies. In an effort to resolve this issue, PRS subframes can be adjusted accordingly, e.g., by looking for the next available DL subframe. In some embodiments, a new PRS configuration may be issued after switching if there is a PRS inconsistency. However, this may not desirable due to overhead and latency. As another option, the eNB may ensure consistent PRS configuration before and after switching. From the UE perspective, a UE may discard an inconsistent PRS configuration after switching.

For certain aspects, the PRS configuration may be updated based on the current TDD DL/UL subframe configuration. As an example, for each possible TDD DL/UL subframe configuration that a cell may use, a PRS configuration may be signaled (e.g., broadcast or unicast). Then for a given TDD DL/UL subframe configuration in use, the UE may select the corresponding PRS configuration.

As another example, the UE may autonomously update PRS configuration based on DL subframe availability. For example, for a cell starting with configuration #2 (e.g., DSUDDDSUDD), PRS may be transmitted in subframe #3 every 160 ms. If the cell later switches to configuration #0 (e.g., DSUUUDSUUU) where subframe #3 is now an uplink subframe, the UE may determine that PRS is now transmitted in subframe #5 (e.g., the first downlink subframe after downlink subframe #3 in the current DL/UL subframe configuration) every 160 ms.

As a further example of potential PRS configuration inconsistencies, there may be issues with CP length change during a subframe configuration switch. As an example, a cell starts with the configuration #2 (e.g., DSUDDDSUDD), subframe #3 is an MBSFN subframe, and PRS is transmitted in subframe #3 every 160 ms (as a result, the CP for PRS is extended CP). Later, the cell switches to configuration #0 (e.g., DSUUUDSUUU), and the PRS may be determined to be transmitted in subframes #5 (e.g., a non-MBSFN subframe) every 160 ms. As a result, the PRS may need to be changed from extended CP to normal CP, if subframe #0 is normal CP. In other words, the CP length for PRS may be determined based on the current DL/UL subframe configuration, and the CP length may change after TDD DL/UL subframe configuration switching, with or without explicit signaling involved.

For certain aspects, PRS may not be transmitted if there is a subframe mismatch. As an example, if a cell starts with configuration #2 (e.g., DSUDDDSUDD), PRS may be transmitted in subframe #3 every 160 ms. If the cell later switches to configuration #0 (e.g., DSUUUDSUUU) where subframe #3 is now an uplink subframe, PRS may not be transmitted. As another example, if a cell starts with configuration #2 (e.g., DSUDDDSUDD), PRS may be transmitted in subframes #0 and #3 (e.g., $N_{PRS}$=2) every 160 ms. If the cell later switches to configuration #0 (DSUUUDSUUU) where subframe #3 is now an uplink subframe, PRS may only be transmitted in subframe #0, although $N_{PRS}$=2. This same design can also be applied to MBSFN subframes. For example, if a MBSFN subframe in a first TDD DL/UL subframe configuration becomes an uplink subframe in a second TDD DL/UL subframe configuration, the MBSFN subframe may skipped (e.g., MBMS is not transmitted).

In addition, the location of PRS may not necessarily be in the center. Currently, PRS may be transmitted in the center of downlink system bandwidth—although PRS bandwidth may be the same or less than downlink system bandwidth. It may be beneficial for a narrowband PRS (e.g., less than DL system bandwidth) to be transmitted in a non-center region (e.g., to avoid collision with PSS/SSS/PBCH). The location of PRS may be informed to the UEs or predetermined (e.g., the location explicitly in the specification).

As used herein, a phrase referring to "at least one of" a list of items refers to any combination of those items, including single members. As an example, "at least one of: a, b, or c" is intended to cover: a, b, c, a-b, a-c, b-c, and a-b-c.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or combinations thereof. A software/firmware module may reside in random access memory (RAM), flash memory, read only memory (ROM), erasable programmable ROM (EPROM), electrically EPROM (EEPROM), phase change memory (PCM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. The computer-readable medium may be a non-transitory computer-readable medium. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. The computer-readable medium may be embodied in a computer program product. By way of example, a computer program product may include a computer-readable medium in packaging materials. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method for wireless communications by a user equipment (UE), comprising:
   determining a first set of one or more downlink subframes for receiving positioning reference signals (PRS) when communicating according to a first subframe configuration that defines one or more uplink subframes and one or more downlink subframes;
   receiving an indication of a switch from the first subframe configuration to a second subframe configuration; and
   determining a second set of one or more downlink subframes for receiving PRS when communicating according to the second subframe configuration, wherein the first set of one or more downlink subframes for receiving PRS and the second set of one or more downlink subframes for receiving PRS are defined based on one or more common downlink subframes between the first subframe configuration and the second subframe configuration.

2. The method of claim 1, wherein the first set of one or more downlink subframes for receiving PRS and the second set of one or more downlink subframes for receiving PRS are the same.

3. The method of claim 1, further comprising omitting receiving PRS in at least one PRS subframe based on the first set of one or more downlink subframes for receiving PRS and the second subframe configuration.

4. The method of claim 1, wherein determining the second set of one or more downlink subframes for receiving PRS comprises receiving signaling indicating the one or more common downlink subframes.

5. The method of claim 1, wherein:
the first set of one or more downlink subframes for receiving PRS is defined based on downlink subframes associated with the first subframe configuration, and
the second set of one or more downlink subframes for receiving PRS is defined based on downlink subframes associated with the second subframe configuration.

6. The method of claim 5, wherein one or more of the downlink subframes associated with the first subframe configuration are different from one or more of the downlink subframes associated with the second subframe configuration.

7. The method of claim 1, further comprising:
receiving a list of sets of one or more downlink subframes for receiving PRS that correspond to different subframe configurations; and
wherein determining the second set of one or more downlink subframes for receiving PRS comprises selecting a set of one or more downlink subframes for receiving PRS from the list of sets of one or more downlink subframes for receiving PRS that correspond to the second subframe configuration.

8. The method of claim 1, wherein determining the second set of one or more downlink subframes for receiving PRS comprises determining a cyclic prefix (CP) type for the second set of one or more downlink subframes for receiving PRS.

9. The method of claim 8, wherein determining the CP type for the second set of one or more downlink subframes for receiving PRS comprises receiving an indication whether the CP type for the second set of one or more downlink subframes for receiving PRS is a normal CP or an extended CP.

10. The method of claim 1, further comprising:
receiving an indication of a frequency location of PRSs transmitted in downlink subframes.

11. An apparatus for wireless communications by a user equipment (UE), comprising:
means for determining a first set of one or more downlink subframes for receiving positioning reference signals (PRS) when communicating according to a first subframe configuration that defines one or more uplink subframes and one or more downlink subframes;
means for receiving an indication of a switch from the first subframe configuration to a second subframe configuration; and
means for determining a second set of one or more downlink subframes for receiving PRS for receiving PRS when communicating according to the second subframe configuration, wherein the first set of one or more downlink subframes for receiving PRS and the second set of one or more downlink subframes for receiving PRS are defined based on one or more common downlink subframes between the first subframe configuration and the second subframe configuration.

12. The apparatus of claim 11, wherein the first set of one or more downlink subframes for receiving PRS and the second set of one or more downlink subframes for receiving PRS are the same.

13. The apparatus of claim 11, further comprising omitting receiving PRS in at least one PRS subframe based on the first set of one or more downlink subframes for receiving PRS and the second subframe configuration.

14. The apparatus of claim 11, wherein the means for determining the second set of one or more downlink subframes for receiving PRS comprises means for receiving signaling indicating the one or more common downlink subframes.

15. The apparatus of claim 11, wherein:
the first set of one or more downlink subframes for receiving PRS is defined based on downlink subframes associated with the first subframe configuration, and
the second set of one or more downlink subframes for receiving PRS is defined based on downlink subframes associated with the second subframe configuration.

16. The apparatus of claim 15, wherein one or more of the downlink subframes associated with the first subframe configuration are different from one or more of the downlink subframes associated with the second subframe configuration.

17. The apparatus of claim 11, further comprising:
means for receiving a list of sets of one or more downlink subframes for receiving PRS that correspond to different subframe configurations; and
wherein the means for determining the second set of one or more downlink subframes for receiving PRS comprises means for selecting a set of one or more downlink subframes for receiving PRS from the list sets of one or more downlink subframes for receiving PRS that correspond to the second subframe configuration.

18. The apparatus of claim 11, wherein the means for determining the second set of one or more downlink subframes for receiving PRS comprises means for determining a cyclic prefix (CP) type for the second set of one or more downlink subframes for receiving PRS.

19. The apparatus of claim 18, wherein the means for determining the CP type for the second set of one or more downlink subframes for receiving PRS comprises means for receiving an indication whether the CP type for the second set of one or more downlink subframes for receiving PRS is a normal CP or an extended CP.

20. The apparatus of claim 11, further comprising:
means for receiving an indication of a frequency location of PRSs transmitted in downlink subframes.

21. An apparatus for wireless communications by a user equipment (UE), comprising:
at least one processor configured to:
determine a first set of one or more downlink subframes for receiving positioning reference signals (PRS) when communicating according to a first subframe configuration that defines one or more uplink subframes and one or more downlink subframes;
receive an indication of a switch from the first subframe configuration to a second subframe configuration; and
determine a second set of one or more downlink subframes for receiving PRS for receiving PRS when communicating according to the second subframe configuration, wherein the first set of one or more downlink subframes for receiving PRS and the second set of one or more downlink subframes for receiving PRS are defined based on one or more common downlink subframes between the first subframe configuration and the second subframe configuration; and
a memory coupled to the at least one processor.

22. A non-transitory computer-readable medium having instructions stored thereon, the instructions being executable by one or more processors and the instructions comprising:
instructions for determining a first set of one or more downlink subframes for receiving positioning reference signals (PRS) when communicating according to a first subframe configuration that defines one or more uplink subframes and one or more downlink subframes;

instructions for receiving an indication of a switch from the first subframe configuration to a second subframe configuration; and instructions for determining a second set of one or more downlink subframes for receiving PRS for receiving PRS when communicating according to the second subframe configuration, wherein the first set of one or more downlink subframes for receiving PRS and the second set of one or more downlink subframes for receiving PRS are defined based on one or more common downlink subframes between the first subframe configuration and the second subframe configuration.

23. A method for wireless communications by a user equipment, comprising:

determining a first set of one or more downlink subframes for receiving positioning reference signals (PRS) from a first cell when communicating according to a first subframe configuration that defines one or more uplink subframes and one or more downlink subframes; and determining a second set of one or more downlink subframes for receiving PRS from a second cell when communicating according to a second subframe configuration, wherein the first set of one or more downlink subframes for receiving PRS and the second set of one or more downlink subframes for receiving PRS are defined based on one or more common downlink subframes between the first subframe configuration and the second subframe configuration.

24. The method of claim 23, wherein the first set of one or more downlink subframes for receiving PRS and the second set of one or more downlink subframes for receiving PRS are the same.

25. The method of claim 23, further comprising omitting receiving PRS in at least one PRS subframe based on the first set of one or more downlink subframes for receiving PRS and the second subframe configuration.

26. The method of claim 23, wherein:

the first set of one or more downlink subframes for receiving PRS is defined based on downlink subframes associated with the first subframe configuration, and the second set of one or more downlink subframes for receiving PRS is defined based on downlink subframes associated with the second subframe configuration.

27. An apparatus for wireless communications by a user equipment, comprising:

means for determining a first set of one or more downlink subframes for receiving positioning reference signals (PRS) from a first cell when communicating according to a first subframe configuration that defines one or more uplink subframes and one or more downlink subframes; and means for determining a second set of one or more downlink subframes for receiving PRS from a second cell when communicating according to a second subframe configuration, wherein the first set of one or more downlink subframes for receiving PRS and the second set of one or more downlink subframes for receiving PRS are defined based on one or more common downlink subframes between the first subframe configuration and the second subframe configuration.

28. The apparatus of claim 27, wherein the first set of one or more downlink subframes for receiving PRS and the second set of one or more downlink subframes for receiving PRS are the same.

29. The apparatus of claim 27, further comprising omitting receiving PRS in at least one PRS subframe based on the first set of one or more downlink subframes for receiving PRS and the second subframe configuration.

30. The apparatus of claim 27, wherein:

the first set of one or more downlink subframes for receiving PRS is defined based on downlink subframes associated with the first subframe configuration, and the second set of one or more downlink subframes for receiving PRS is defined based on downlink subframes associated with the second subframe configuration.

31. An apparatus for wireless communications by a user equipment, comprising:

at least one processor configured to:

determine a first set of one or more downlink subframes for receiving positioning reference signals (PRS) from a first cell when communicating according to a first subframe configuration that defines one or more uplink subframes and one or more downlink subframes; and determine a second set of one or more downlink subframes for receiving PRS from a second cell when communicating according to a second subframe configuration, wherein the first set of one or more downlink subframes for receiving PRS and the second set of one or more downlink subframes for receiving PRS are defined based on one or more common downlink subframes between the first subframe configuration and the second subframe configuration; and a memory coupled to the at least one processor.

32. A non-transitory computer-readable medium having instructions stored thereon, the instructions being executable by one or more processors and the instructions comprising:

instructions for determining a first set of one or more downlink subframes for receiving positioning reference signals (PRS) from a first cell when communicating according to a first subframe configuration that defines one or more uplink subframes and one or more downlink subframes; and instructions for determining a second set of one or more downlink subframes for receiving PRS from a second cell when communicating according to a second subframe configuration, wherein the first set of one or more downlink subframes for receiving PRS and the second set of one or more downlink subframes for receiving PRS are defined based on one or more common downlink subframes between the first subframe configuration and the second subframe configuration.

33. The method of claim 10, wherein:

the frequency locations of the PRSs are outside of a center region of a bandwidth of the downlink subframes.

* * * * *